US012270170B2

(12) United States Patent
Sweetman

(10) Patent No.: US 12,270,170 B2
(45) Date of Patent: Apr. 8, 2025

(54) SYSTEMS AND METHODS FOR BLOCKING A SURGE OF WATER

(71) Applicant: The Texas A&M University System, College Station, TX (US)

(72) Inventor: John Albert Sweetman, Galveston, TX (US)

(73) Assignee: Texas A&M University System, College Station, TX (US)

( * ) Notice: Subject to any disclaimer, the term of this patent is extended or adjusted under 35 U.S.C. 154(b) by 239 days.

(21) Appl. No.: 18/021,969

(22) PCT Filed: Aug. 20, 2021

(86) PCT No.: PCT/US2021/046982
§ 371 (c)(1),
(2) Date: Feb. 17, 2023

(87) PCT Pub. No.: WO2022/040579
PCT Pub. Date: Feb. 24, 2022

(65) Prior Publication Data
US 2023/0358006 A1    Nov. 9, 2023

Related U.S. Application Data

(60) Provisional application No. 63/067,945, filed on Aug. 20, 2020.

(51) Int. Cl.
*E02B 7/36*    (2006.01)
*E02B 7/28*    (2006.01)

(52) U.S. Cl.
CPC . *E02B 7/36* (2013.01); *E02B 7/28* (2013.01)

(58) Field of Classification Search
CPC ... E02B 7/28; E02B 7/50; E02B 3/102; E02B 3/104; E02B 7/36
See application file for complete search history.

(56) References Cited

U.S. PATENT DOCUMENTS 7,744,310 B2 *    6/2010   Alpern .................... E02B 3/104
                                                                405/87

FOREIGN PATENT DOCUMENTS

| CN | 114351647 A | * | 4/2022 | |
|---|---|---|---|---|
| GB | 2451294 A | * | 1/2009 | ............ E02B 3/104 |
| JP | 2012-255292 A | | 12/2012 | |
| KR | 10-2003-0063250 A | | 7/2003 | |
| KR | 10-1010661 B1 | | 1/2011 | |
| KR | 10-2013-0064841 A | | 6/2013 | |
| KR | 10-2015-0001389 A | | 1/2015 | |

OTHER PUBLICATIONS

Dialog machine translation of KR10-2013-0064841 (Year: 2013).*
Dialog machine translation of KR10-2003-0062350 (Year: 2003).*
International Search Report and Written Opinion dated Dec. 17, 2021, for Application No. PCT/US2021/046982.

* cited by examiner

*Primary Examiner* — Janine M Kreck
(74) *Attorney, Agent, or Firm* — Conley Rose, P.C.

(57) ABSTRACT

A surge gate for blocking a surge of water includes a sleeve disposed below a waterline of the water, wherein the sleeve has an open upper end and a closed lower end, and a piston slidably disposed in the sleeve, wherein the piston is configured to rise vertically within the sleeve along a vertical axis between a first position with an upper end of the piston positioned below the waterline, and a second position with the upper end of the piston positioned above the waterline.

20 Claims, 9 Drawing Sheets

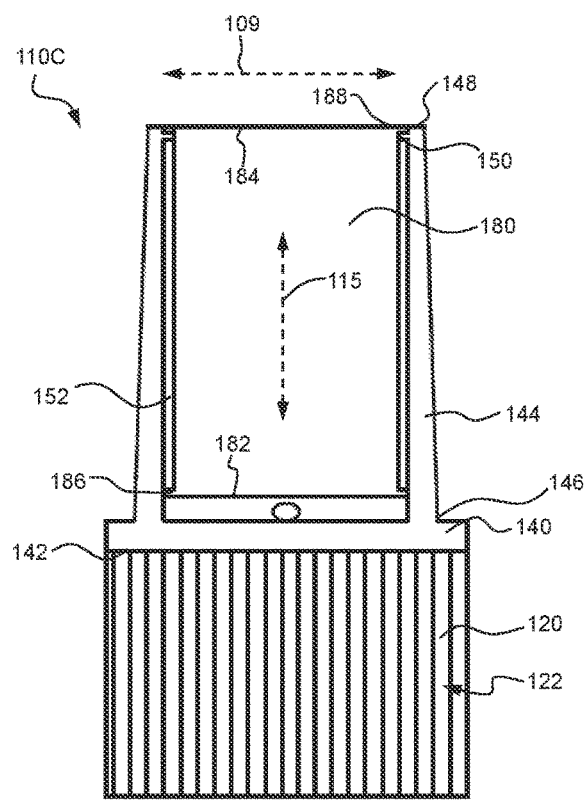 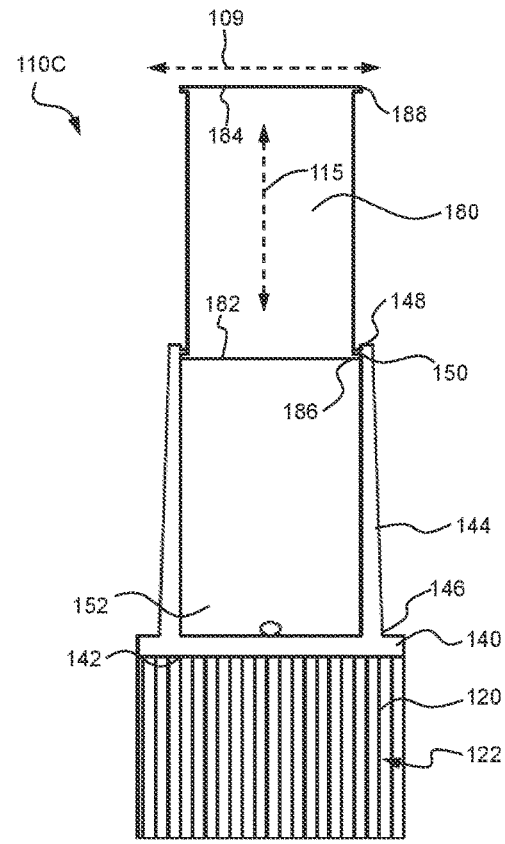
FIG. 3
FIG. 4

SYSTEMS AND METHODS FOR BLOCKING A SURGE OF WATER

CROSS-REFERENCE TO RELATED APPLICATIONS

This application 35 U.S.C. § 371 national stage application of PCT/US2021/046982 filed Aug. 20, 2021, entitled "Systems and Methods for Blocking a Surge of Water", which claims benefit of U.S. provisional patent application No. 63/067,945 filed Aug. 20, 2020, se entitled "Piston Gate for Storm Surge Protection," both of which are hereby incorporated herein by reference in their entirety for all purposes.

STATEMENT REGARDING FEDERALLY SPONSORED RESEARCH OR DEVELOPMENT

The invention was made with government support under M1702634 awarded by the U.S. Army Corps of Engineers. The government has certain rights in the invention.

BACKGROUND

At least some coastal areas when unprotected may be subject to coastal flooding following exposure to a low-pressure weather system such as, for example, a tropical or extratropical storm, hurricane, and cyclone. Such low-pressure weather systems may cause a rise of water in the coastal area such as, for example, a storm surge, a storm flood, a tidal surge, and/or a storm tide, which may threaten the lives and property of those located in the coastal area. Infrastructure such as storm surge barriers may be constructed along the coastal area for protection. Particularly, the storm surge barrier may prevent or restrain a storm surge or similar phenomenon from flooding a protected area positioned behind the storm surge barrier. In this manner, the storm surge barrier may form or comprise a component of a flood protection system configured to protect the coastal area.

BRIEF SUMMARY OF THE DISCLOSURE

An embodiment of a surge gate for blocking a surge of water comprises a sleeve disposed below a waterline of the water, wherein the sleeve has an open upper end and a closed lower end, and a piston slidably disposed in the sleeve, wherein the piston is configured to rise vertically within the sleeve along a vertical axis between a first position with an upper end of the piston positioned below the waterline, and a second position with the upper end of the piston positioned above the waterline. In some embodiments, the sleeve defines an upper end of the surge gate when the piston is in the first position. In some embodiments, the piston is moveably disposed within a central channel of the sleeve, wherein the central channel of the sleeve has a rectangular prismatic shape and the piston has a rectangular prismatic shape that mates with the rectangular prismatic shape of the central channel of the sleeve. In certain embodiments, the piston has a greater buoyancy when in the second position than when the piston is in the first position. In certain embodiments, piston comprises an inner cavity that is in fluid communication with one or more fluid conduits configured to supply a compressed gas and a flow of water to the inner cavity of the piston. In some embodiments, the surge gate comprises a pump coupled to the one or more fluid conduits and configured to pump the water from the inner cavity of the piston into a chamber formed between a lower end of the piston and the lower end of the sleeve. In some embodiments, an upper end of the piston includes a first lip extending radially outward from an outer periphery of the piston, the upper end of the sleeve includes a second lip extending radially inward from the sleeve, and the first lip is configured to vertically abut and sit atop the second lip with the piston in the first position. In certain embodiments, a lower end of the piston includes a third lip extending radially outward from an outer periphery of the piston, and the third lip is configured to vertically abut and sit below the second lip with the piston in the second position.

An embodiment of a system for blocking a surge of water comprises a plurality of the surge gates positioned side-by-side to allow closure and complete opening of navigable passages of unlimited width within the water above or between the plurality of surge gates. In some embodiments, the system comprises a secondary closure system configured to block water passage between each pair of adjacent pistons of the plurality of surge gates with the pair of surge gates in the second position.

An embodiment of a surge gate for blocking a surge of water comprises a sleeve disposed below a waterline of the water, wherein the sleeve has an open upper end and a closed lower end, and a piston slidably disposed in the sleeve, wherein the piston comprises a first position with an upper end of the piston positioned below the water surface, and a second position with the upper end of the piston positioned above the water surface, wherein the piston has a first buoyancy when in the first position and a second buoyancy when in the second position, and wherein the second buoyancy is greater than the first buoyancy. In some embodiments, the piston comprises an inner cavity a majority of which is filled with water when in the first position and the majority of which is filled with compressed gas when in the second position. In some embodiments, the piston comprises a plurality of the inner cavities, wherein each of the plurality of inner cavities is separated by a bulkhead. In certain embodiments, the inner cavity of the piston is in fluid communication with one or more fluid conduits configured to supply a compressed gas and a flow of water to the inner cavity of the piston. In some embodiments, the surge gate comprises a pump coupled to the one or more fluid conduits and configured to pump the water from the inner cavity of the piston into a chamber formed between a lower end of the piston and the lower end of the sleeve. In some embodiments, an upper end of the piston includes a first lip extending radially outward from an outer periphery of the piston, the upper end of the sleeve includes a second lip extending radially inward from the sleeve, and the first lip is configured to vertically abut and sit atop the second lip with the piston in the first position. In certain embodiments, a lower end of the piston includes a third lip extending radially outward from an outer periphery of the piston, and the third lip is configured to vertically abut and sit below the second lip with the piston in the second position. An embodiment of a system for blocking a surge of water comprises a plurality of the surge gates of claim positioned side-by-side to allow closure and complete opening of navigable passages of unlimited width within the water above or between the plurality of surge gates. In some embodiments, the system comprises a secondary closure system configured to block water passage between each pair of adjacent pistons of the plurality of surge gates with the pair of surge gates in the second position.

An embodiment of a method for blocking a surge of water comprises (a) injecting air into a cavity of a piston of a surge gate, and (b) flowing water out of the inner cavity of the piston as the air is injected into the inner cavity whereby the piston rises vertically within a sleeve of the surge gate along a vertical axis between a first position with an upper end of the piston positioned below a waterline of the water, and a second position with the upper end of the piston positioned above the waterline.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of exemplary embodiments of the disclosure, reference will now be made to the accompanying drawings in which:

FIG. 3 is a cross-sectional side view of one of the surge gates of FIG. 2 in an open configuration;

FIG. 4 is a cross-sectional side view of the surge gate of FIG. 3 in a closed configuration;

DETAILED DESCRIPTION

Figure 1:
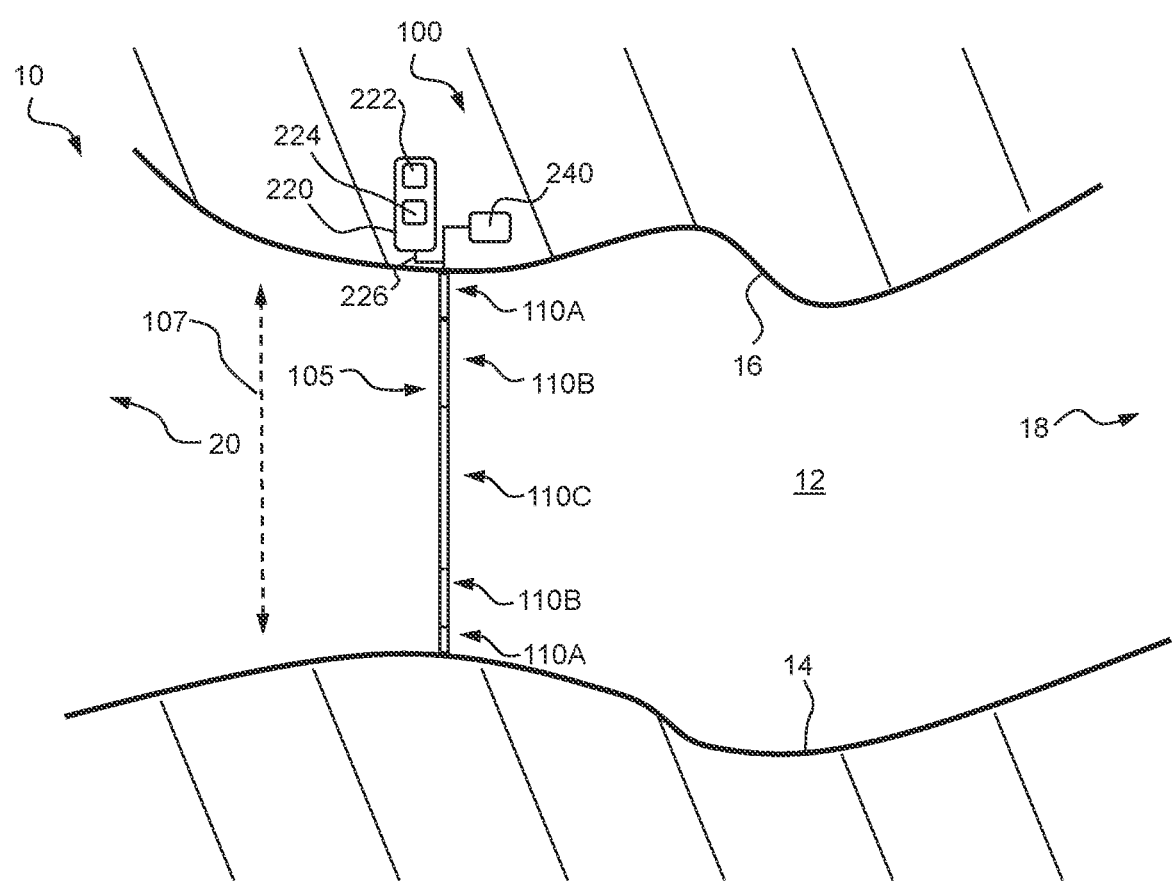
FIG. 1 is a schematic top view an embodiment of a system in accordance with principles described herein for blocking a surge of water.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

As described above, at least some coastal areas when unprotected are subject to flooding by storm surges and similar phenomena produced by low-pressure weather systems. For this reason, systems for blocking a surge of water may be erected to protect coastal areas or other locations from rising or surging water. These systems may comprise storm surge barriers configured to restrain rising or surging water produced by a storm surge or similar phenomenon from flooding a protected area located behind the storm surge barrier. Storm surge barriers may comprise moveable storm surge gates having an open configuration to allow the passage of ships, wildlife, and the flow of ice, water (e.g., tidal flow), etc. through the storm surge gate; and a closed configuration to restrain a surge or rapid rise in water through the storm surge gate so as to prevent the flooding of a protected area associated with the storm surge gate.

In general, the performance of a given storm surge barrier or gate may be evaluated based on a variety of factors such as the cost, maintainability, reliability, environmental impact, and impact on water systems. Conventional storm surge gates may comprise, for example, flap gates, barge, gates, and wicket gates, each of which have limitations associated with their performance. For example, conventional flap gates, which pivot about a horizontal axis when actuated into a closed configuration, may require a flap comprising a relatively large buoyant base to provide a sufficiently large restoring moment about the horizontal axis in severe storm surge events. Thus, the footprint of a flap gate having the capacity to restrain surging water during severe storm surge events may be relatively great, increasing the cost in erecting the flap gate while also resulting in a relatively greater environmental impact. Additionally, silt may collect within the base of the flap gate when it is disposed in the open configuration, hindering the flap gate from actuating into the closed configuration absent a silt control system which may increase the cost and complexity of the flap gate and in-turn reduce the reliability and maintainability of the flap gate. Additionally, some flap gates and/or other conventional storm surge gates may protrude above the seabed when in the closed configuration, thereby interfering with the flow of water across the gate, which may result in a negative long-term environmental impact to the area in which the conventional gate is erected. Further, some conventional storm surge gates may have a limited maximum length (in the horizontal direction) and thus may be incapable of spanning relatively large openings such as some major navigation channels.

Accordingly, embodiments of systems and methods for blocking a surge of water are described herein. Particularly, embodiments disclosed herein include a system for blocking a surge of water comprising a plurality of buoyancy activated, vertically rising surge gates. Embodiments of surge gates described herein include a rectilinear extendable piston housed within a sleeve of a base that may be embedded within a seabed. The piston includes a first or lower position corresponding to an open configuration of the surge gate and a second or upper position corresponding to a closed configuration of the surge gate. The piston extends rectilinearly from and into the sleeve of the surge gate to actuate between the lower and upper positions. Particularly, in embodiments disclosed herein, the piston is displaced vertically by adjusting a buoyancy of the piston such that a buoyancy force selectively and controllably moves the piston vertically upwards from the lower position (open configuration) into the upper position (closed configuration). The buoyancy of the piston may be controlled by a ballast system. The ballast system operates by pumping water out of the inner cavity of the piston, and may include injection of compressed gas (e.g., air) to displace water and thereby assist the pumping of the water or as a backup system in the event of pump failure. The compressed gas is injected into an inner cavity of the piston while water is pumped from the inner cavity in order to increase the buoyancy of the piston such that a buoyancy force exerted on the piston is sufficient to lift the piston vertically upwards into the upper position. Additionally, the ballast system may pump water into the inner cavity to reduce the buoyancy of the piston such that the weight of the piston exceeds the buoyancy and moves the piston downwards into the lower position. Pumping of the water from the inner to the outer cavity may also provide the benefit of minimizing sediment deposition within the surge gate.

Embodiments of surge gates disclosed herein may be positioned beneath the seabed such that there is minimal environmental impact when a surge gate or a system comprising surge gates is in an open configuration. For example, in some embodiments, the pistons of the surge gates may be entirely received within sleeves of the surge gates when in the open configuration whereby the pistons are located entirely beneath the seabed. Additionally, given that the pistons of the surge gates rise vertically in a rectilinear manner, the base of the surge gate may be minimized to thereby minimize the footprint of the surge gate as compared to some conventional designs such as flap gates.

Additionally, embodiments of systems and methods for blocking a surge of water described herein may be utilized in applications in which large differential head pressures may be formed across the system and/or applications having weak upper soils given that the surge gates of the systems described herein eliminate geotechnical point loading and instead spread the ground reaction over the entire length of the surge gate. Distributing the ground reaction across the entire length of the surge gate also enables nearly unlimited open spans (e.g., the length of the system that may be opened and closed) by positioning the surge gates side-by-side such that a full navigable width of a large fluid passageway remains available in normal weather conditions.

Referring now to FIG. 1, a system 100 for blocking a surge of water is shown. System 100 generally includes a plurality of storm surge barriers or gates 110A, 1106, and 110C (each indicated generally by arrows 110A, 1106, 110C), a ballast system 220 coupled to gates 110A, 1106, 110C, and a control system 240 coupled to ballast system 220 and gates 110A, 1106, 110C. In this exemplary embodiment, system 100 is located in a coastal area 10 including an opening or channel 12 extending between a pair of opposing shorelines 14, 16. As shown in FIG. 1, system 100 is positioned to selectively block the flow of water resulting from a rise or surge of water in channel 12 moving from the right to left. Thus, the channel 12 may be described as extending from a fluid inlet 18 (to the right in FIG. 1) to a fluid outlet 20 (to the left in FIG. 1). As will be described further herein, surge gates 110A, 1106, 110C are generally positioned side-by-side to allow the complete closure and complete opening of navigable passages of unlimited width within the water above or between the plurality of surge gates 110A, 1106, 110C.

Fluid inlet 18 may comprise the open sea, a gulf, an ocean or some other large body of water. Fluid outlet 20 may comprise a bay, a lagoon, a river, and/or some other body of water. System 100 is generally configured to protect the fluid outlet 20 from surging or rising water produced from fluid inlet 18. In this manner, system 100 may prevent the onshore areas located proximal fluid outlet 20 from flooding in response to a surge of water from fluid inlet 18. In other embodiments, the terrain in which system 100 is located may vary from the coastal area 10 shown in FIG. 1. Similarly, the configuration of the area protected by system 100 may vary from the fluid outlet 20 shown in FIG. 1.

In this exemplary embodiment, surge gates 110A, 1106, 110C, collectively, form a retractable barrier 105 extending entirely and continuously in a longitudinal direction (indicated by arrow 107 in FIG. 1) between the opposing shorelines 14, 16 of channel 12, and is generally oriented perpendicular to channel 12 and the flow of water therein. In this manner, system 100 may block an entire width of channel 12 when surge gates 110A, 1106, 110C are each in a closed configuration, as will be described further herein. Although a particular number of surge gates 110A, 1106, 110C are shown in FIG. 1, in general, system 100 may comprise one or more surge gates 110A, 1106, 110C positioned directly adjacent and linked or connected to each other. For example, system 100 may comprise a plurality of surge gates 110C connected longitudinally end-to-end (in the longitudinal direction 107) and spanning between a pair of pluralities of surge gates 110B flanking the plurality of surge gates 110C.

In this exemplary embodiment, surge gates 110B, 110C are similar to each other in configuration and operation. However, the size of surge gates 110B, 110C may vary. Particularly, in this exemplary embodiment, surge gates 110C of system 100 have a greater vertical height (orthogonal the longitudinal direction 107) when in the closed configuration as compared to surge gates 110A, 110B of system 100. Conversely, surge gates 1110A have a lesser vertical height when in the closed configuration as compared with both surge gates 110B, 110C. The difference in vertical height of surge gates 110A, 110B, 110C reflects the difference in mean sea level (MSL) at the locations at which surge gates 110A, 1106, 110C are positioned across channel 12.

Additionally, the horizontal length (extending in the longitudinal direction 107) of surge gates 110A, 110B, 110C may be comparable to each other.

Figure 2:
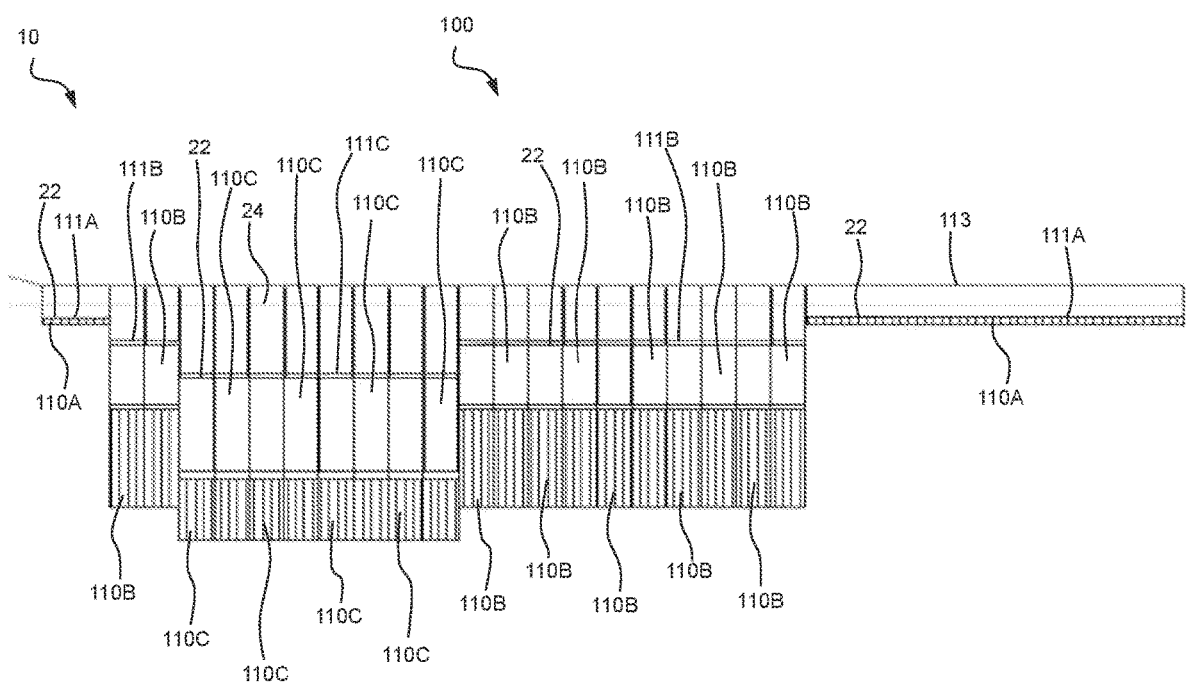
FIG. 2 is a front view of the plurality of surge gates of the system of FIG. 1.
Figure 5:
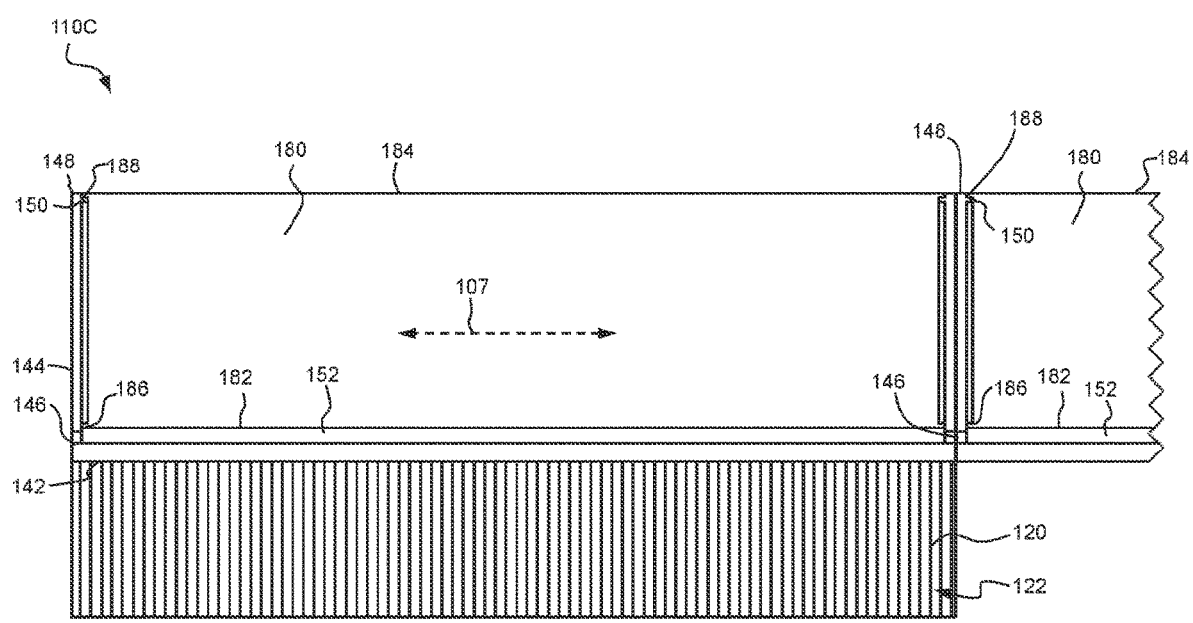
FIG. 5 is a cross-sectional front view of the surge gate of FIG. 3 in the open configuration.
Figure 6:
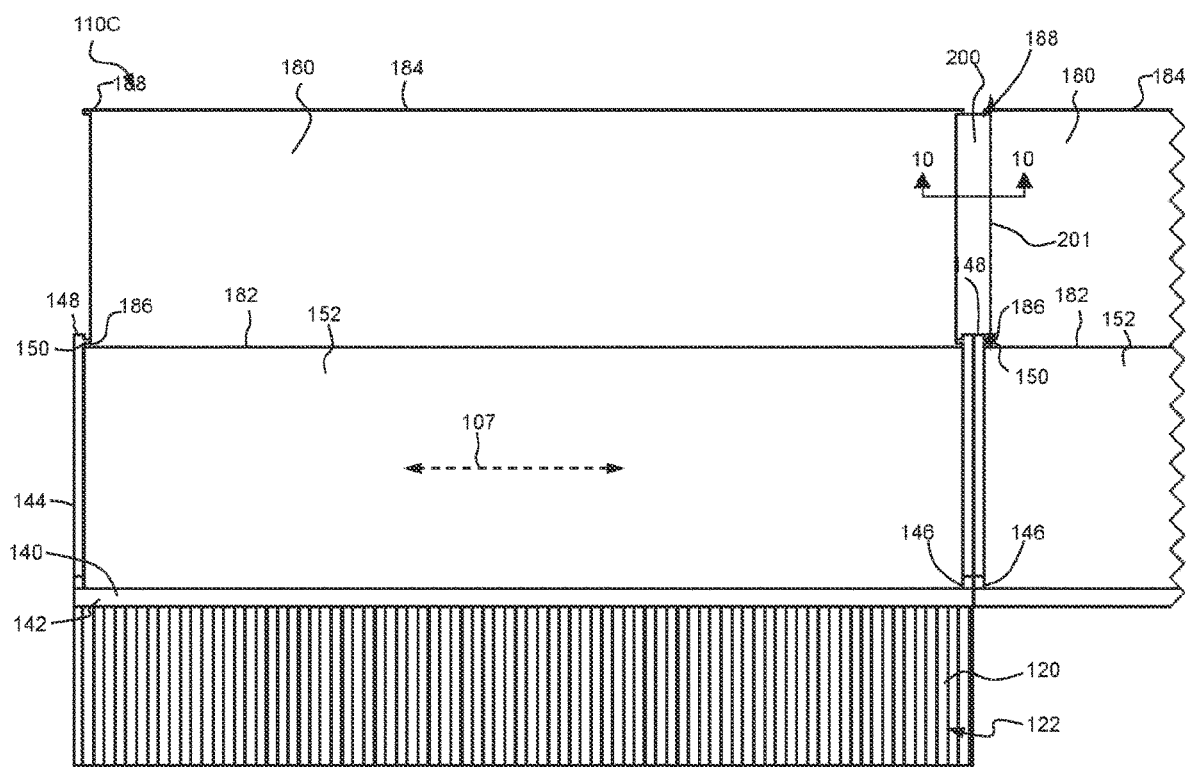
FIG. 6 is a cross-sectional front view of the surge gate of FIG. 3 in the closed configuration.
Figure 7:
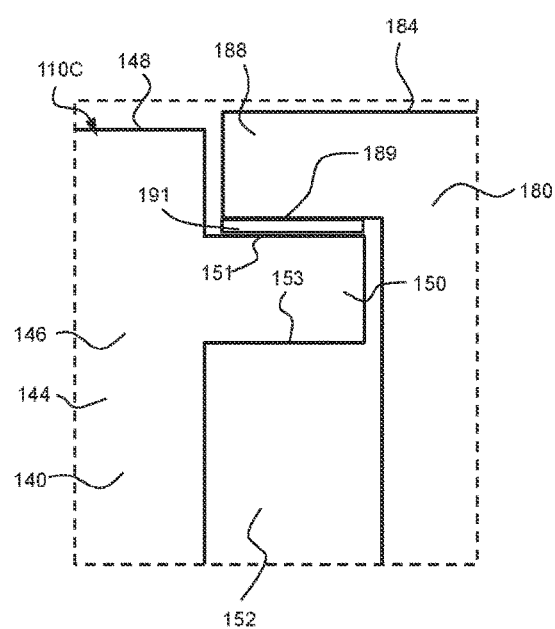
FIG. 7 is an enlarged, cross-sectional front view of the surge gate of FIG. 3 in the open configuration.
Figure 8:
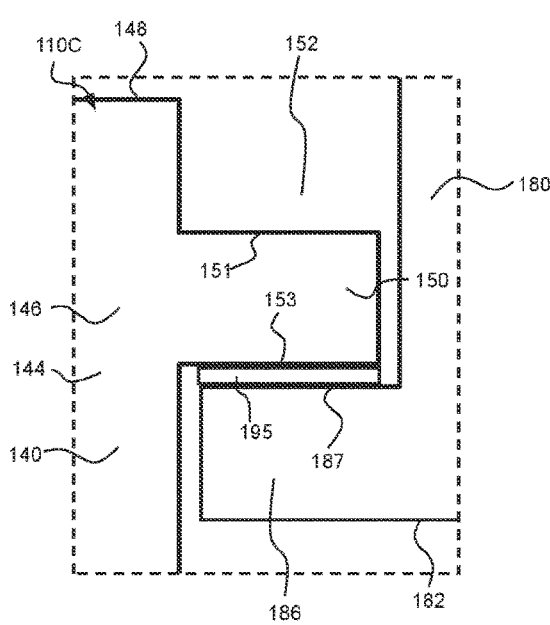
FIG. 8 is an enlarged, cross-sectional front view of the surge gate of FIG. 3 in the closed configuration.
Figure 9:
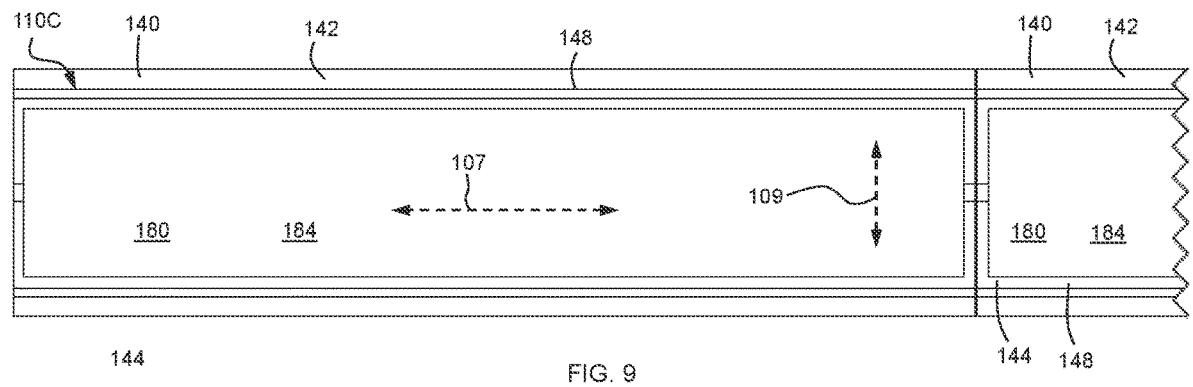
FIG. 9 is a top view of the surge gate of FIG. 3 in the open configuration.
Figure 10:
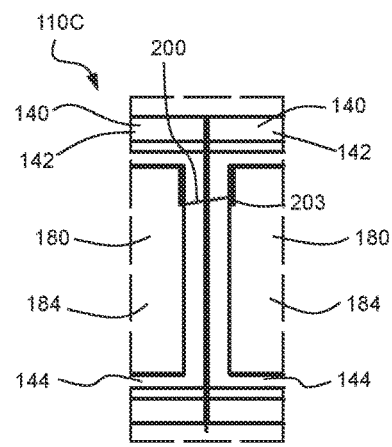
FIG. 10 is an enlarged cross-sectional bottom view of the surge gate of FIG. 3 taken along lines 10-10 of FIG. 6.

A front view of the system 100 of FIG. 1 is shown in FIG. 2. Particularly, FIG. 2 illustrates the relationship between surge gates 110A, 110B, 110C and a seabed 22 and a MSL 24 of the channel 12. Additionally, unlike FIG. 1, FIG. 2 illustrates each specific surge gate 110A, 110B, 110C. In this exemplary embodiment, the portion of seabed 22 along which surge gates 110A, 110B, 110C has been dredged such that seabed 22 is located at a similar vertical height as a minimum or open vertical height 111A (corresponding to surge gates 110A), 111B (corresponding to surge gates 110B), and 111C (corresponding to surge gates 110C). The open vertical heights 111A, 111B, 111C of surge gates 110A, 110B, 110C vary in vertical height with respect to each other given the difference in size between surge gates 110A, 110B, 110C. Particularly, the open vertical height 111C of surge gates 110C is lower or less than both the open vertical height 111B of surge gates 110B and the open vertical height 111C of surge gates 110C. Additionally, the open vertical height 111B of surge gates 110B is higher or greater than the open vertical height 111C of surge gates 110C but less than the open vertical height 111A of surge gates 110A.

Given that the open vertical heights 111A, 111B, 111C of surge gates 110A, 110B, 110C vary, the vertical height of dredged seabed 22 correspondingly varies with the open vertical heights 111A, 111B, 111C of surge gates 110A, 110B, 110C. In this exemplary embodiment, the seabed 22 is dredged such that the dredged seabed 22, extending along the width of channel 12, is located slightly below the open vertical heights 111A, 111B, 111C of surge gates 110A, 110B, 110C (e.g., the portion of dredged seabed 22 located along surge gates 110B is located slightly below open vertical height 111B, the portion of dredged seabed 22 located along surge gates 110C is located slightly below open vertical height 111C, etc.). However, in other embodiments, the vertical height of dredged seabed 22 may be equal to or greater than the open vertical heights 111A, 111B, 111C of surge gates 110A, 110B, 110C. Additionally, the vertical height of the seabed 22 prior to dredging may be greater than the open vertical heights 111A, 111B, 111C of surge gates 110A, 110B, 110C.

FIG. 2 additionally illustrates a vertical maximum or closed vertical height 113 of surge gates 110A, 110B, 110C. Unlike the open vertical heights 111A, 111B, 111C of surge gates 110A, 110B, 110C, the closed vertical height 113 of surge gates 110A, 110B, 110C is substantially the same. Additionally, the closed vertical height 113 of surge gates 110A, 110B, 110C is greater than the corresponding open vertical heights 111A, 111B, 111C of surge gates 110A, 110B, 110C. Further, the closed vertical height 113 of surge gates 110A, 110B, 110C is greater than the MSL 24 of channel 12 such that system 100 may restrain or block a rise in the water of channel 12 that is greater than the MSL 24. The difference between the closed vertical height 113 and MSL 24 may vary substantially based on the particular application. For at least this reason, the difference between the closed vertical height 113 and the open vertical heights 111A, 111B, 111C of surge gates 110A, 110B, 110C may also vary substantially based on the particular application.

Referring now to FIGS. 3-10, one of the surge gates 110C of system 100 in both the open configuration (FIGS. 3, 5, 7, and 9) and closed configuration (FIGS. 4, 6, and 8) are shown. Although only surge gate 110C is shown in FIGS. 3-10, it is to be understood that, in this exemplary embodiment, surge gates 110B are configured similarly (although differently sized) as surge gates 110C. Additionally, in this exemplary embodiment, surge gates 110A comprise barge gates and thus are not described in detail. However, in other embodiments, surge gates 110A may also be similar in configuration (although again differently sized) as surge gates 110C. In still other embodiments, surge gates 110A may comprise various types of surge gates of different configurations.

Surge gate 110C may be described as extends in the longitudinal direction 107 (lengthwise direction shown in FIG. 5), a lateral direction 109 (widthwise direction shown in FIG. 3) orthogonal the horizontal direction 107, and in a vertical direction 115 (shown in FIG. 3) orthogonal both the longitudinal direction 107 and lateral direction 109. For clarity, a second surge gate 110C is shown partially in FIGS. 5 and 6. Vertical direction 115 may also comprise a rectilinear vertical axis 115, and thus, may also be referred to herein as vertical axis 115. Directions 107, 109 each comprise horizontal directions extending generally parallel the surface of the earth while vertical direction 115 extends vertically relative to the surface of the earth. Surge gate 110C of system 100 generally includes a support foundation 120, a support base 140, and a vertically displaceable piston 180 receivable in support base 140. Particularly, piston 180 is configured to extend telescopically from the support base 140 and thus support base 140 may also be referred to herein as cylinder 140. Foundation is 120 is generally configured to physically support the base 140 and piston 180 of surge gate 110C. Particularly, loads applied to base 140 and/or piston 180 during the operation of surge gate 110C are reacted against the foundation 120 and thereby transmitted to the earth surrounding foundation 120. Particularly, all hydrostatic and hydrodynamic forces and moments applied to the surge gate 110C may be reacted by a plurality of piles 122 of foundation 120. Given that piles 122 are uniformly distributed across the entire length of surge gate 110C, the ground reaction is spread along the entire length of surge gate 110C, thereby eliminating geotechnical point loading.

In this exemplary embodiment, foundation 120 comprises the plurality of vertically extending, elongate piles (indicated generally by arrow 122) that extend through the earth beneath seabed 22. Particularly, piles 122 comprise structural steel H-beam piles. However, in other embodiments, the configuration of piles 122 may vary. For example, in other embodiments, piles 122 may comprise steel pipe piles. In other embodiments, piles 122 may comprise concrete piles rather than steel piles. In still other embodiments, foundation 120 may not include piles 122. In some embodiments, piles 122 may be installed into the seabed 22 by conventional driving (hammering), drilling, and grouting. In other embodiments, piles 122 may be installed using suction embedment. In relatively shallow applications, the foundation (e.g., foundation 120) may comprise direct (concrete) grouting to the bedrock beneath the seabed. The foundation 120 of surge gate 110C may be relatively shorter in height (extending along vertical direction 115) than the foundation 120 of surge gate 110 given that surge gates 110 are in a relatively shallower position (relative to MSL 24) than surge gates 110C, and thus, the earthen soil surrounding the foundation 120 of surge gates 110 may be looser and less compacted than the earthen soil surrounding the foundation of surge gates 110C. In this exemplary embodiment, the vertical height of the foundation 120 of surge gate 110C is between about 30 feet (ft) and 70 ft, while the vertical height of the foundation 120 of surge gate 110B is between about 70 ft and 120 ft; however, in other embodiments, the vertical height of the foundation 120 of surge gates 110C and/or 110B may vary.

Base 140 of surge gate 110C is generally configured to slidably receive piston 180 and to react loads from piston 180 whereby loads applied to base 140 and/or piston 180 may be transmitted through base 140 to the foundation 120 of surge gate 110C as described above. In this exemplary embodiment, base 140 generally includes a foundation cap 142 and a sleeve 144 extending vertically from the foundation cap 142. In this exemplary embodiment, foundation cap 142 is generally planar, plate-shaped structure extending in the longitudinal and lateral directions 107, 109, respectively. Foundation cap 142 is fixably coupled to the upper ends of piles 122 of foundation 120, and thus, may also be referred to herein as a pile cap 142. In this configuration, loads applied to the foundation cap 142 from the sleeve 144, piston 180, and/or the surrounding environment may be distributed to the plurality of piles 122 comprising the foundation 120 in this exemplary embodiment. The piles 122 of foundation 120 are configured to resist all environmental loading such that there is no requirement for the soil surrounding the foundation cap 142 to be reconsolidated after installation of base 140.

As described above, sleeve 144 of base 140 extends vertically upwards from foundation cap 142 such that it may receive the piston 180 of surge gate 110C. In this exemplary embodiment, sleeve 144 extends entirely around and entirely encloses a perimeter of the piston 180. However, in other embodiments sleeve 144 may comprise one or more separate retaining walls which do not entirely encircle and enclose the piston 180 and instead are spaced from each other by one or more gaps extending about the perimeter of piston 180. Sleeve 144 extends from a lower end 146 fixed to the foundation cap 142 to a terminal upper end 148. Sleeve 144, and hence ends 146, 148, extends along the longitudinal length (extending in the longitudinal direction 107) of the surge gate 110C. In this exemplary embodiment, the upper end 148 of sleeve 144 is positioned slightly above the piston 180 of surge gate 110C when gate 110C is in the open configuration, and thereby defines the open vertical height of surge gate 110C. However, in other embodiments, piston 180 may extend above the upper end 148 of sleeve 144 when surge gate 110C is in the open configuration and thereby define the open vertical height of surge gate 110C.

In this exemplary embodiment, sleeve 144 comprises a rectangular base lip 150 that extends horizontally and radially into a central cavity or channel 152 formed within the sleeve 144. In this exemplary embodiment, both the central channel 152 and piston 180 have a rectangular prismatic shape whereby the rectangular prismatic shape of the piston 180 mates with the rectangular prismatic shape of the central channel 152; however, in other embodiments, the shape of central channel 152 and piston 180 may vary. As will be described further herein, the base lip 150 of sleeve 144 is configured to limit and arrest the rectilinear, vertically upwards travel of the piston 180 of surge gate 110C when surge gate 110C is actuated into the closed configuration such that piston 180 cannot entirely escape the central channel 152 and inadvertently separate from the base 140 of surge gate 110C. Additionally, base lip 150 of sleeve 144 may limit and arrest the vertical downward motion of piston 180 when surge gate 110C is actuated into the open configuration. Thus, base lip 150 of sleeve 144 may delimit the rectilinear, vertically upward and downward motion of piston 180. In this exemplary embodiment, the vertical height of the sleeve 144 of surge gate 110C is between about 60 ft and 110 ft, while the vertical height of the sleeve 144 of surge gate 110B is between about 30 ft and 70 ft; however, in other embodiments, the vertical height of the sleeve 144 of surge gates 110C and/or 1106 may vary.

In this exemplary embodiment, foundation cap 142 and sleeve 144 of base 140 are integrally formed of the same or similar materials; however, in other embodiments, foundation cap 142 and sleeve 144 may comprise separate and distinct structures formed from different materials. Additionally, in this exemplary embodiment, base 140 comprises high-strength concrete with steel or re-bar reinforcement. In other embodiments, base 140 may comprise a metal or metal alloy and/or other materials. Additionally, in some embodiments, additional or supplementary buoyancy may be provided to base 140 during the installation of surge gate 110C (similarly for the installation of surge gate 110B). For example, one or more supplemental buoyancy cylinders or cavities (not shown in FIGS. 3-10) may be coupled to the base 140 of surge gate 110C such that base 140 is made neutrally buoyant during installation. The additional buoyancy provided by the supplemental buoyancy cavities allows for the usage of relatively smaller and less expensive lifting cranes to be used when installing the base 140.

Figure 11:
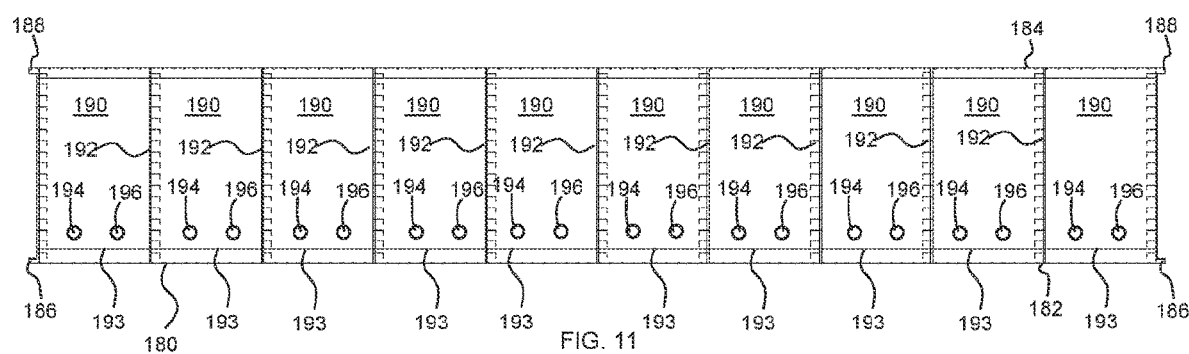
FIG. 11 is a cross-sectional front view of the piston of the surge gate of FIG. 3.
Figure 12:
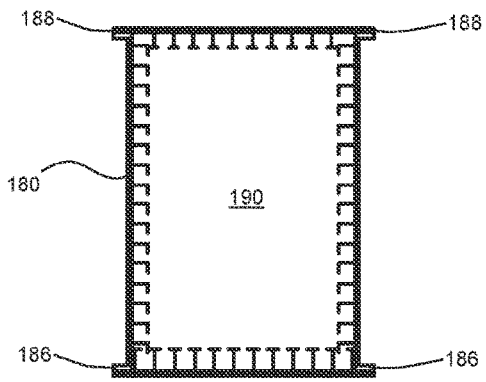
FIG. 12 is a cross-sectional side view of the piston of FIG. 11.

Referring now to FIGS. 3-12, additional views of the piston 180 of surge gate 110C are provided in FIGS. 11, 12. Piston 180 of surge gate 110C is slidably received in the central channel 152 of sleeve 144 and includes a first or lower position corresponding to the open configuration of surge gate 110C and a second or upper position vertically spaced from the lower position in the vertical direction 115 that corresponds to the closed configuration of surge gate 110C. Thus, piston telescopically extends vertically from sleeve 144 as it transitions from the lower position to the upper position. Additionally, in this exemplary embodiment, base 140 defines an upper end of the surge gate 110C when the piston 180 is in the lower position. As will be described further herein, piston 180 is actuated between the lower and upper positions by the ballast system 220 of system 100. In this exemplary embodiment, piston 180 is generally rectangular in shape and extends vertically between a first or lower end 182 and a second or upper end 184 opposite the lower end 182. In other embodiments, the shape of piston 180 may vary from the rectangular shape shown in FIGS. 3-12.

In this exemplary embodiment, piston 180 incudes a horizontally extending first or lower lip 186 and a horizontally extending second or upper lip 188 vertically spaced from the lower lip 186. Particularly, lower lip 186 is positioned at the lower end 182 of piston 180 while the upper lip 188 is positioned at the upper end 184 of piston 180. Additionally, lips 186, 188 each extend entirely about the perimeter of piston 180 at the ends 182, 184 thereof, respectively. However, in other embodiments, lips 186, 188 may extend only partially about piston 180 (e.g., along the front and rear of piston 180, etc.). Lips 186, 188 of piston 180 are configured to engage and abut the base lip 150 of the sleeve 144 of base 140. As shown particularly in FIG. 7, a lower engagement surface 189 of the upper lip 188 of piston 180 rests upon an opposing upper engagement surface 151 of the base lip 150 when piston 180 is in the lower position with surge gate 110C in the open configuration. Particularly, in this exemplary embodiment, the lower engagement surface 189 of upper lip 188 rests upon and contacts a compliant pad 191 positioned between the lower engagement surface 189 of upper lip 188 and the upper engagement surface 151 of base lip 150. In this configuration, piston 180 is suspended from the sleeve 144 of base 140 such that the lower end 184 of piston 180 is vertically spaced from the base 140. Additionally, engagement between upper lip 188 of piston 180 and the base lip 150 of base 140 may provide a restriction extending at least partially about the perimeter of piston 180 whereby silt and other materials are at least partially prevented or obstructed from entering the central passage 152 and potentially fouling or hindering the operation of surge gate 110C. Conversely, as shown particularly in FIG. 8, an upper engagement surface 187 of the lower lip 186 of piston 180 engages and abuts an opposing lower engagement surface 153 of base lip 150 when piston 180 is in the upper position with surge gate 110C in the closed configuration. Particularly, in this exemplary embodiment, the upper engagement surface 187 of lower lip 186 contacts another compliant pad 195 positioned between the upper engagement surface 187 of lower lip 186 and the lower engagement surface 153 of base lip 150. Compliant pads 191, 195 may each comprise a compliant material (e.g., elastomeric materials, soft metals or metal alloys such as aluminum, etc.) to make up for imperfect tolerances between the mating surfaces. In this manner, piston 180 is prevented from escaping entirely from the central passage 152 of base 140 and thus remains retained to base 140 when surge gate 110C is actuated into the closed configuration.

As shown particularly in FIGS. 11 and 12, in this exemplary embodiment, piston 180 comprises a hollow structure including a plurality of separate sealed internal inner cavities 190 positioned side-by-side along the longitudinal length (extending the longitudinal direction 107) of piston 180. Inner cavities 190 are sealed from each other and divided by a plurality of corresponding vertically extending internal bulkheads 192. Additionally, piston 180 comprises a plurality of longitudinal stiffeners 193 which extend along the longitudinal direction 107. Stiffeners increase the structural rigidity of piston 180 such that piston 180 is equipped to resist the hydrostatic pressure applied to piston 180 with each inner cavity 190 filled with air at atmospheric pressure.

The plurality of distinct and separate inner cavities 190 prevent the failure of the entire surge gate 110C in the event that the outer shell forming piston 180 should be pierces, become cracked, etc., whereby fluid communication is provided between the interior of piston 180 and the surrounding environment. Particularly, should an opening inadvertently form at a specific location in piston 180 then only a single inner cavity 190 may be compromised, allowing the piston 180 to continue to operate via the remaining inner cavities 190. Additionally, the presence of inner cavities 190 reduces the length of the longitudinal stiffeners 193 such that a single longitudinal stiffener 193 need not traverse the entire longitudinal length of the piston 180. While in this exemplary embodiment piston 180 includes a plurality of separate buoyant inner cavities 190, in other embodiments, the interior of piston 180 may comprise only a single buoyant inner cavity 190.

In this exemplary embodiment, each inner cavity 190 is fluidically connected to a corresponding pair of ports 194, 196 of piston 180. In other words, piston 180 comprises a plurality of inner cavities 190 and an associated plurality of pairs of ports 194, 196. In this exemplary embodiment, first port 194 comprises an air port 194 configured to communicate air (or any other gaseous fluid) between the corresponding inner cavity 190 and the ballast system 220 of system 100. Additionally, in this exemplary embodiment, second port 196 of the pair of ports 194, 196 comprises a water port 196 configured to communicate water (or any other liquid) between the corresponding inner cavity 190 and the ballast system 220 of system 100. Ports 194, 196 are only shown schematically in FIG. 11, and thus the position and configuration of ports 194, 196 may vary. In still other embodiments, each inner cavity 190 may be associated with only a single port configured to communicate air and/or water between the inner cavity 190 and the ballast system 220.

In this exemplary embodiment, piston 180 of surge gate 110C is comprised of a metal or metal alloy such as structural steel and is constructed as a large barge. Additionally, piston 180 avoids the usage of curved plates and other features that may restrict the piston 180 from being constructed conveniently outside of a large shipyard. However, in other embodiments, the materials comprising piston 180 may vary. For example, in some embodiments, piston 180 may comprise a reinforced concrete structure (reinforced via pre- or post-tensioning) and/or other materials such as fiberglass, etc. Additionally, in this exemplary embodiment, the longitudinal length (extending in the longitudinal direction 107) of the piston 180 of both surge gate 110C and surge gate 1106 is approximately between 250 ft and 350 ft; however, in other embodiments, the longitudinal length of piston 180 for the surge gate 110C and/or surge gate 1106 may vary. In this exemplary embodiment, the vertical height (extending in the vertical direction 115 between ends 182, 184) of the piston 180 of surge gate 110C is approximately between 70 ft and 120 ft, while the vertical height of the piston 180 of surge gate 1106 is approximately between 30 ft and 70 ft; however, in other embodiments, the vertical height of piston 180 for the surge gate 110C and/or surge gate 1106 may vary.

In this exemplary embodiment, system 100 additionally includes a secondary closure system or water blocking members 200 (shown particularly in FIGS. 6 and 10), which extend between and are connected to the pistons 180 of adjacently positions surge gates 110B, 110C of system 100. Water blocking members 200 prevent water from leaking between adjacent pistons 180 when the surge gates 110B, 110C of system 100 are actuated into the closed configuration. In some embodiments, the water blocking members 200 may also be connected to surge gates 110A. Additionally, water blocking members 200 may extend along almost the entirety of the vertical height of pistons 180. In this exemplary embodiment, water blocking members 200 comprise a hinged gate coupled between a pair of adjacent pistons 180, and thus may also be referred to herein as hinged gate 200. The hinged gate 200 may rotate about a vertical axis 201 once each of the surge gates 110A, 110B, 110C of the system 100 are actuated into the closed configuration. For example, the hinged gate 200 may comprise a plate (e.g. a steel plate) hinged to a first piston 180 by a hinge or pivot joint 203 and that rotates about the vertical axis 201 to contact an adjacent piston 180 upon actuation of the surge gates 110A, 110B, 110C into the closed configuration. In other embodiments, a sliding gate, membrane, or other mechanism may be utilized to prevent water from flowing between adjacent pistons 180 positioned in the upper position.

As described above, ballast system 220 is configured to actuate each of the surge gates 110B, 110C between the open and closed configurations. Ballast system 220 may actuate gates 110B, 110C repeatedly an indefinite number of times. Additionally, in some embodiments, ballast system 220 may also actuate surge gates 110A between open and closed configurations. Ballast system 220 actuates surge gates 110B, 110C between their respective open and closed configurations by adjusting the ballast of the pistons of surge gates 110B, 110C. Particularly, in this exemplary embodiment, ballast system 220 comprises one or more hydraulic pumps 222 and one or more compressors 224 (each shown schematically in FIG. 1). Pumps 222 of ballast system 220 are configured to transport water between ballast system 220 and the inner cavities 190 of the pistons 180 of surge gates 110B, 110C. Similarly, compressors 224 are configured to transport compressed air between ballast system 220 and the inner cavities 190 of the pistons 180 of surge gates 110B, 110C.

Water and/or air may be communicated between ballast system 220 and pistons surge gates 110B, 110C via one or more fluid conduits 226 extending from ballast system 220 and surge gates 110B, 110C. Fluid conduits 226 may extend through passages formed in the bases 140 of surge gates 110B, 110C. Additionally, in this exemplary embodiment, fluid conduits 226 are connected with the pair of ports 194, 196 of the inner cavities 190 of the piston 180 of each surge gate 110G, 110C. In this configuration, each inner cavity 190 of a given piston 180 is fluidically connected to the one or more pumps 222 and one or more compressors of ballast system 220.

As described above, ballast system 220 actuates each surge gate 110G, 110C by displacing the piston 180 of the given gate 110G, 110C vertically (along the vertical direction 115) between the lower and upper positions thereof. For example, when a surge gate 110C is actuated from the open configuration to the closed configuration, the one or more pumps 222 pump fluid from each inner cavity 190 of the piston 180 of the surge gate 110C at the same time as the one or more compressors inject air into each inner cavity 190 of the piston 180. The one or more pumps 222 may be configured to dump the water extracted from the inner cavities 190 of the piston 180 into the portion of the central passage 152 of base 140 located beneath the lower end 182 of the piston 180 so as to minimize the intake of silt into central passage 152 during the actuation of surge gate 110C. As pumps 222 dump water from inner cavities 190 as compressors 224 inject air therein, the inner cavities 190 of piston 180 fill with air, increasing the buoyancy of piston 180 such that a buoyancy force applied to piston 180 forces piston 180 vertically upwards through the water comprising channel 12 and into the upper position corresponding to the closed configuration of surge gate 110C.

While in this exemplary embodiment the pumps 222 of ballast system 220 are located onshore, in other embodiments, pumps 222 could be located offshore and could be coupled, for example, to the base 140 of the surge gate 110C. Additionally, while in this embodiment both pumps 222 and compressors 224 are activated to displace the piston 180 vertically into the upper position, in other embodiments, only the pumps 222 and/or compressors 224 may be activated to fill the inner cavities 190 of piston 180 with air and thereby displace piston 180 upwardly into the upper position. For example, pumps 222 may be utilized to evacuate water from the inner cavities 190 of piston 180 in the event of a failure of compressors 224. Conversely, compressors 224 may be relied on to discharge water from the inner cavities 190 of piston 180 in the event of a failure of pumps 222. Additionally, in some embodiments ballast system 220 may only comprise pumps 222 or compressors 224.

When a surge gate 110C is actuated from the closed configuration to the open configuration, the one or more compressors 224 suction air from each inner cavity 190 of the piston 180 of surge gate 110C at the same as the one or more pumps 222 pump water into each inner cavity 190 of the piston 180. As with the actuation of surge gate 110C into the closed configuration described above, only the pumps 222 or compressors 224 may be activated to flood the cavities 190 of piston 180 with water. In some embodiments, pumps 222 may pump water from central passage 152 positioned beneath piston 180 into the inner cavities 190 of piston 180. As cavities 190 of piston 180 fill with water, the buoyancy of piston 180 declines until the weight of piston 180 forces piston 180 downwards and into the lower position corresponding to the open configuration of surg gate 110C. In this manner, each surge gate 110B, 110C may be selectably and repeatedly actuated between the open and closed configurations. Additionally, in some embodiments, surge gates 110A may be actuated between open and closed configurations in a similar manner.

In this embodiment, control system 240 is configured to control the operation of ballast system 220 to thereby and in-turn control the configurations of surge gates 110A, 110B, 110C. For example, control system 240 may operate ballast system 220 to actuate each of the surge gates 110A, 110B, 110C into a closed configuration, thereby placing system 100 into a closed configuration configured to block or at least restrain a surge of water from the fluid inlet 18 and thereby protect the fluid outlet 20 and surrounding areas from flooding. Conversely, control system 240 may operate ballast system 220 to actuate each of the surge gates 110A, 110B, 110C into an open configuration, thereby placing system 100 into an open configuration configured to permit fluid, vessels, and other materials or objects to travel across surge gates 110A, 110B, 110C with minimal impact to the surrounding environment. Control system 240 may be in signal communication with controllers of ballast system 220 configured for operating the one or more pumps 222 and one or more compressors 224.

In some embodiments, control system 240 may be operated locally by personnel of system 100 located at a facility proximal surge gates 110A, 110B, 110C. In other embodiments, control system 240 may be operated directly by personnel located remotely. In such embodiments control system 240 may comprise a communication system configured to allow the remote personnel to issue commands to the control system 240. In still other embodiments, control system 240 may receive information corresponding to local conditions (e.g., local weather conditions, the height of the water line of channel 12, etc.) and be configured to operate ballast system 220 automatically based on received information. Thus, control system 240 may be manually or automatically operated to control the configuration (e.g., open or closed) of system 100 to thereby protect the fluid outlet 20 and surrounding areas from flooding.

Figure 13:
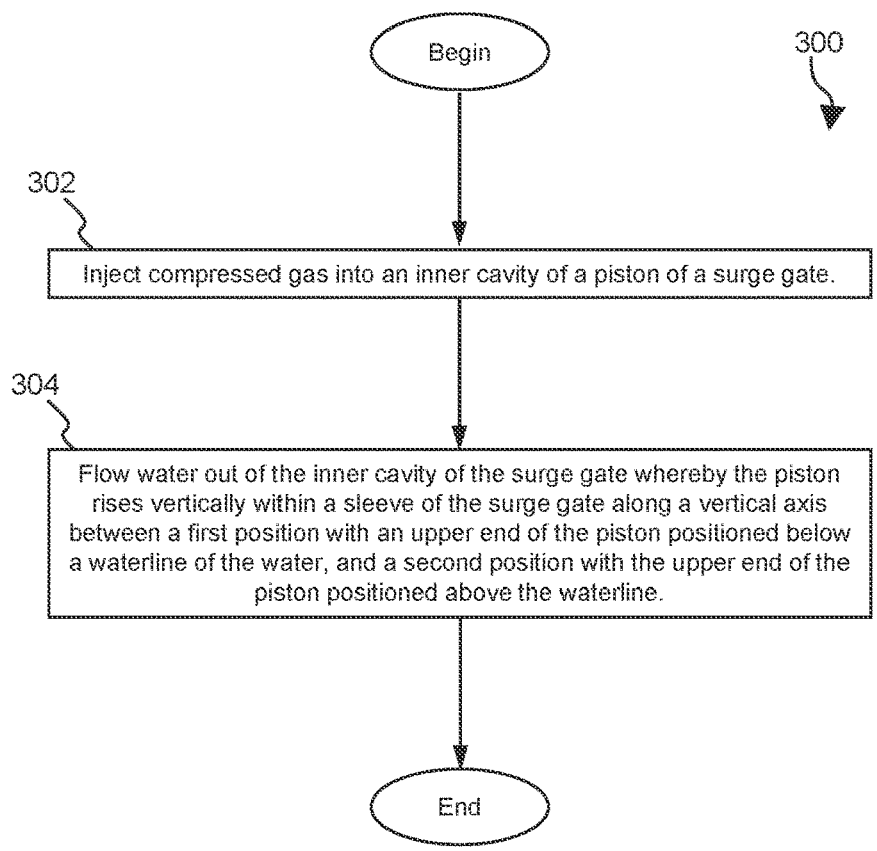
FIG. 13 is a flow chart illustrating an embodiment of a method in accordance with principles described herein for blocking a surge of water.

Referring to FIG. 13, an embodiment of a method 300 for blocking a surge of water. Beginning at block 302, method 300 comprises injecting compressed gas into an inner cavity of a piston of a surge gate. In some embodiments, block 302 comprises injecting air into the inner cavities 190 of the piston 180 of one of the surge gates 110B, 110C of system 100 shown in FIG. 1. The air may be injected by the one or more compressors 224 of the ballast system 220 of system 100. At block 304, method 300 comprises flowing water out of the inner cavity of the surge gate as the air is injected into the inner cavity whereby the piston rises vertically within a sleeve of the surge gate along a vertical axis between a first position with an upper end of the piston positioned below a waterline of the water, and a second position with the upper end of the piston positioned above the waterline. In some embodiments, block 304 comprises pumping water from the inner cavities 190 of the piston 180 of one of the surge gates 110B, 110C. For example, the water may be pumped by the one or more pumps 222 of the ballast system 220 of system 100. In some embodiments, in addition to blocks 302, 304, method 300 may also comprise releasing air out of the inner cavity of the piston as water is pumped into the inner cavity whereby the piston lowers vertically within the sleeve from the second position to the first position.

While embodiments of the disclosure have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A surge gate for blocking a surge of water, the surge gate comprising:
   a sleeve disposed below a waterline of the water, wherein the sleeve has an open upper end and a closed lower end; and
   a piston slidably disposed in the sleeve, wherein the piston is configured to rise vertically within the sleeve along a vertical axis between a first position with an upper end of the piston positioned below the waterline, and a second position with the upper end of the piston positioned above the waterline.

2. The surge gate of claim 1, wherein the sleeve defines an upper end of the surge gate when the piston is in the first position.

3. The surge gate of claim 1, wherein the piston is moveably disposed within a central channel of the sleeve, wherein the central channel of the sleeve has a rectangular prismatic shape and the piston has a rectangular prismatic shape that mates with the rectangular prismatic shape of the central channel of the sleeve.

4. The surge gate of claim 1, wherein the piston has a greater buoyancy when in the second position than when the piston is in the first position.

5. The surge gate of claim 1, wherein piston comprises an inner cavity that is in fluid communication with one or more fluid conduits configured to supply a compressed gas and a flow of water to the inner cavity of the piston.

6. The surge gate of claim 5, further comprising a pump coupled to the one or more fluid conduits and configured to pump the water from the inner cavity of the piston into a chamber formed between a lower end of the piston and the lower end of the sleeve.

7. The surge gate of claim 1, wherein:
   an upper end of the piston includes a first lip extending radially outward from an outer periphery of the piston;
   the upper end of the sleeve includes a second lip extending radially inward from the sleeve; and
   the first lip is configured to vertically abut and sit atop the second lip with the piston in the first position.

8. The surge gate of claim 7, wherein:
   a lower end of the piston includes a third lip extending radially outward from an outer periphery of the piston; and
   the third lip is configured to vertically abut and sit below the second lip with the piston in the second position.

9. A system for blocking a surge of water, the system comprising:
   a plurality of the surge gates of claim 1 positioned side-by-side to allow closure and complete opening of navigable passages of unlimited width within the water above or between the plurality of surge gates.

10. The system of claim 9, further comprising a secondary closure system configured to block water passage between each pair of adjacent pistons of the plurality of surge gates with the pair of surge gates in the second position.

11. A surge gate for blocking a surge of water, the surge gate comprising:
    a sleeve disposed below a waterline of the water, wherein the sleeve has an open upper end and a closed lower end; and
    a piston slidably disposed in the sleeve, wherein the piston comprises a first position with an upper end of the piston positioned below the water surface, and a second position with the upper end of the piston positioned above the water surface;
    wherein the piston has a first buoyancy when in the first position and a second buoyancy when in the second position, and wherein the second buoyancy is greater than the first buoyancy.

12. The surge gate of claim 11, wherein the piston comprises an inner cavity a majority of which is filled with water when in the first position and the majority of which is filled with compressed gas when in the second position.

13. The surge gate of claim 12, wherein the piston comprises a plurality of the inner cavities, wherein each of the plurality of inner cavities is separated by a bulkhead.

14. The surge gate of claim 12, wherein the inner cavity of the piston is in fluid communication with one or more fluid conduits configured to supply a compressed gas and a flow of water to the inner cavity of the piston.

15. The surge gate of claim 14, further comprising a pump coupled to the one or more fluid conduits and configured to pump the water from the inner cavity of the piston into a chamber formed between a lower end of the piston and the lower end of the sleeve.

16. The surge gate of claim 11, wherein:
    an upper end of the piston includes a first lip extending radially outward from an outer periphery of the piston;
    the upper end of the sleeve includes a second lip extending radially inward from the sleeve; and
    the first lip is configured to vertically abut and sit atop the second lip with the piston in the first position.

17. The surge gate of claim 16, wherein:
    a lower end of the piston includes a third lip extending radially outward from an outer periphery of the piston; and
    the third lip is configured to vertically abut and sit below the second lip with the piston in the second position.

18. A system for blocking a surge of water, the system comprising:
    a plurality of the surge gates of claim 11 positioned side-by-side to allow closure and complete opening of navigable passages of unlimited width within the water above or between the plurality of surge gates.

19. The system of claim 18, further comprising a secondary closure system configured to block water passage between each pair of adjacent pistons of the plurality of surge gates with the pair of surge gates in the second position.

20. A method for blocking a surge of water, comprising:
(a) injecting air into a cavity of a piston of a surge gate; and
(b) flowing water out of the inner cavity of the piston as the air is injected into the inner cavity whereby the piston rises vertically within a sleeve of the surge gate along a vertical axis between a first position with an upper end of the piston positioned below a waterline of the water, and a second position with the upper end of the piston positioned above the waterline.

* * * * *